United States Patent [19]

Silverman et al.

[11] Patent Number: 5,152,499
[45] Date of Patent: Oct. 6, 1992

[54] FLOW DEVICE BODY AND SLIDE-WIRE CONNECTOR NUT

[75] Inventors: Ira J. Silverman, Northridge; Bruce R. Warne, Long Beach, both of Calif.

[73] Assignees: Sequoia Controls Limited, Carson; Waltco Engineering Co., Gardena, both of Calif.

[21] Appl. No.: 525,934

[22] Filed: May 18, 1990

[51] Int. Cl.$^5$ .............................................. F16L 29/00
[52] U.S. Cl. .................................... 251/148; 285/305
[58] Field of Search ................ 251/148; 285/305, 387, 285/388

[56] References Cited

U.S. PATENT DOCUMENTS

| | | | |
|---|---|---|---|
| 2,436,407 | 2/1948 | Stephens | 285/305 X |
| 2,458,714 | 1/1949 | Mahoney | 285/305 X |
| 2,597,482 | 5/1952 | Harrison et al. | 285/305 |
| 2,749,151 | 6/1956 | Lyons | 285/305 X |
| 3,142,498 | 7/1964 | Press | 285/305 X |
| 3,339,832 | 9/1967 | Duecker | 285/305 X |
| 3,759,553 | 9/1973 | Carter | 285/305 X |
| 4,407,482 | 10/1983 | Daghe et al. | 251/148 |
| 4,679,825 | 7/1987 | Taylor | 285/305 X |
| 4,749,192 | 6/1988 | Howeth | 285/305 X |
| 4,817,996 | 4/1989 | Fouts | 285/305 X |

OTHER PUBLICATIONS

Nut Tube Coupling-Swivel—Military Standard MS27073 (3 pages) Date: Jun. 28, 1984.

*Primary Examiner*—John Rivell
*Attorney, Agent, or Firm*—Skjerven, Morrill, MacPherson, Franklin & Friel

[57] ABSTRACT

A weldless one-piece flow device body such as a valve body has one or more tubes or stubs having distal ends of a greater diameter than the stubs, the stubs extending integrally from the valve body. All machining, plating, and valve assembly operations are performed before end fittings such as compression nuts are affixed to the stubs. The compression nuts with internal threads are slid over the stubs' distal ends, and the reverse side of a vacuum face seal on each distal end has a controlled radius $R_0$. The nut includes an internal cylindrical semi-circular groove inboard of the end of the nut opposite the nut threads. An aperture having a diameter equal to or somewhat greater than $2R_0$ extends at an angle through a nut wall and provides a tangential route to force a slide wire into and around the groove and partially into an annulus formed around the stub between the controlled radius $R_0$ and a wall of the valve body. The inner half of the slide wire extending from the semi-circular groove is captured in the annulus and is axially slidable therealong parallel to the stub. When connection tubing is attached, the slide wire is compressed into the controlled recess $R_0$ and a metal gasket compressed between a face seal on the stub distal end and a face sealing surface of the connection tubing.

8 Claims, 2 Drawing Sheets

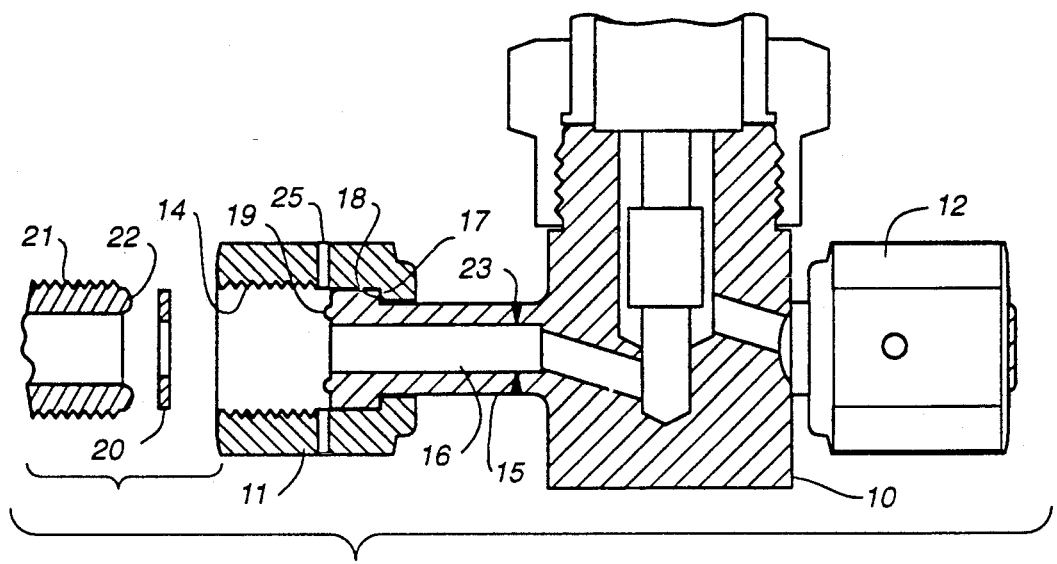
FIG._1 (PRIOR ART)
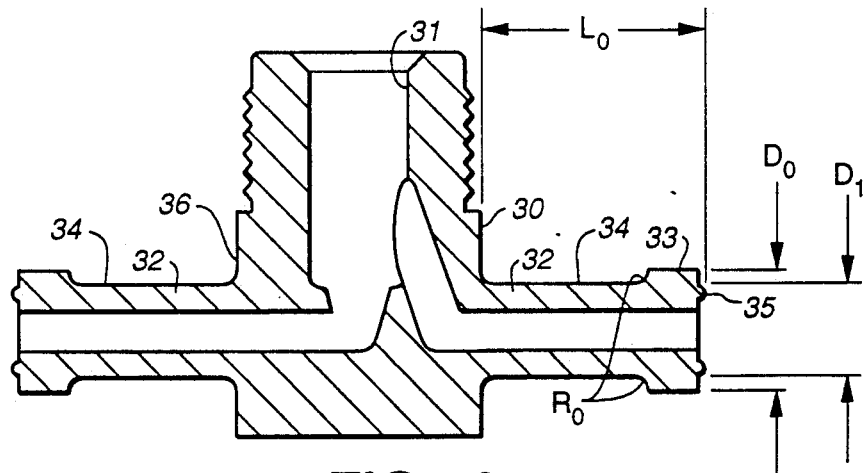
FIG._2
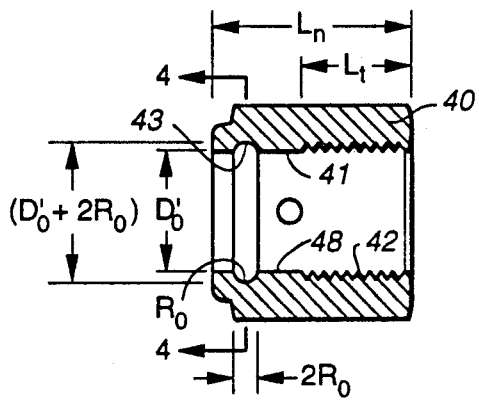
FIG._3
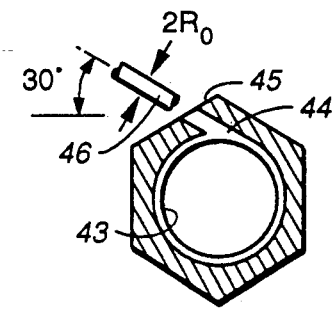
FIG._4

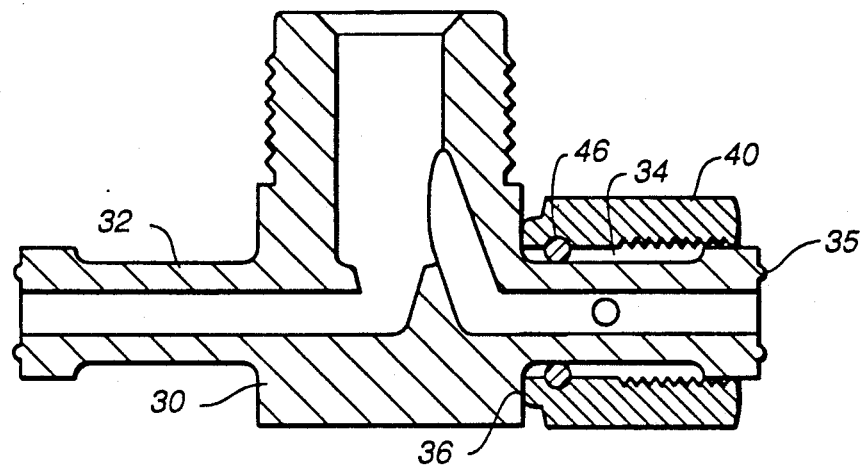
FIG._5
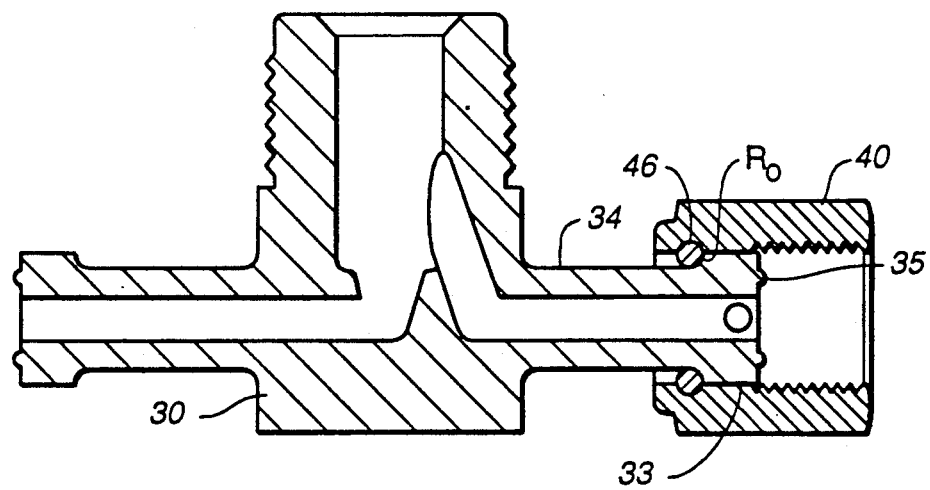
FIG._6

FLOW DEVICE BODY AND SLIDE-WIRE CONNECTOR NUT

BACKGROUND OF THE INVENTION

This invention is directed to the valve or other flow device connector art. More particularly the invention pertains to a connection nut which is fitted to a valve body of a valve used in ultra-high purity valve applications, after the valve body has been machined, after the valve internals have been assembled therein, and after substantially all of the in-process cleaning procedures have been performed.

Current practice in the use of a vacuum face seal for ultra-high-purity gas piping applications is to sandwich a thin metal gasket such as a soft nickel washer between the two machined faces of a coupling to be joined, and to threadedly drive the faces together, thus compressing the gasket and effecting a vacuum-tight seal. The compression is obtained by torquing a specially dimensioned nut on the female side against male threads that are either integral with, or slip over the piping on, the male side. Furthermore, in order to accommodate installation and maintenance requirements, the nut must translate far enough to expose the face seal for installation purposes.

The current standard configuration is the so-called "VCR type" nut or end fittings shown in side view in U.S. Pat. No. 4,634,099 and illustrated in cross-section in FIG. 1 herein. In prior art FIG. 1, a circular nut 11 having exterior hexagon flats 12 thereon and internal threads 14 in one end is first inserted over a narrow tube stub 15 of an outlet or inlet tube 16. An internal end flange 17 of the nut 11 abuts a distal flange 18 on the stub 15 with the interior threads 14 of the nut extending beyond the outer seal face 19 of the stub. The stub is then welded by bead 23 to the valve body 10 such as a valve body confining a bellows valve as seen in the above patent and in the related application. When a connecting tube 21 is to be assembled to the nut, gasket 20 is first placed in the nut to abut the seal face 19. The connecting tube 21 is placed so that its end face 22 is in abutment with the gasket 20 and upon being threaded-up by rotation of the nut, the gasket 20 is compressed between the abutting seal faces 19 and 22. A conventional leak test orifice 25 is also present in nut 11. The VCR nut does have a major disadvantage. Since the minimum inside diameter of the nut is less than the maximum outside diameter of the "VCR type" fitting, and must indeed be designed in such a manner to apply compression through the gasket, it must be slipped over the fitting prior to installing the fitting in the piping system.

While this may not be a major concern in standard piping configurations, it does become a problem in ultra-high purity valve applications. Generally speaking, the valve body must be processed independent of the fittings, and then the fittings welded onto the body as a final operation. The disadvantage here is that the user is left with several weld beads in the system that are not mechanically cleaned up and are detrimental to the gas system. Alternatively, the fittings could be welded to the valve body relatively early in the machining process, and the welds cleaned up as part of that process. In this case, the nuts are carried along with the valve body throughout the remainder of the machining process, where they are subjected to the effects of handling and processing that they would not otherwise be subjected to. This also precludes the use of any platings or coatings as an option, since these would be stripped off during any of several post-machining processes. Additionally, the presence of the nuts on the valve body complicates and can interfere with in-process cleaning procedures.

SUMMARY OF THE INVENTION

The present invention allows complete elimination of a weld at each fitting location, normally at both the inlet and outlet positions of the valve body. The invention also delays the installation of the compression nut until as late as possible in the valve fabrication process. This is accomplished by providing a weldless valve body having one or more elongated cylindrical tubes or stubs of a first diameter extending integrally from a side or end of the valve body. Each tube or stub has a distal end of a second diameter greater than the tube first diameter. All the machining, plating and valve internals assembly operations can be performed on the one-piece valve and tube or stub(s) at this stage. As a normally-last two steps in valve assembly prior to packing and shipping, a compression nut having a third internal diameter slightly greater than the valve stub distal end of the second diameter is slid over the distal end. The reverse side of a vacuum face seal on the distal end has a controlled radius $R_0$. The compression nut is sized to slip over the stub distal end to a position between the main valve body and overlapping with the controlled radius $R_0$.

The compression nut includes an internal semi-circular cylindrical groove slightly inboard of the end of the nut opposite the internal threads. This groove is essentially of the same radius as the controlled radius $R_0$. An aperture of a diameter of $2R_0$ is provided (by drilling or the like) from the outside surface of the nut displaced from the internal threads at one end of the nut and tangentially with the internal semi-circular groove. A slide wire of a precise diameter $2R_0$ minus about 0.02 mm is pressed into the tangent aperture and forced around the entire circumference of the groove and extending in part into an open annulus forming a nut/stub interface. The nut is then "captured" in the annulus and may translate along the length of the annulus between the valve main body and the controlled radius $R_0$ on the reverse end of the stub distal end. The nut is then permanently retained on the fitting end or stub. The valve is then ready for installation in a piping system.

The system assembler merely extends the nut as far as it will slide outwardly so that the slide wire in the internal groove is brought into abutment with the reverse distal end controlled recess $R_0$ and the slide wire compressed into engagement with that controlled recess $R_0$ by rotation of the nut on connection tubing which simultaneously compresses a seal gasket which has been previously placed in the nut against the nut seal face and a facing seal face on the connection tubing.

Mechanical testing has demonstrated that the compressive strength of the slide wire nut connection meets or exceeds that of standard VCR designs. The slide wire when placed in the nut connection of this invention as summarized above, in effect, creates a flange or shoulder on the inner surface of the nut extending into the open annulus which prevents the nut from sliding off the stub distal end while allowing the nut to translate along the annulus between the distal end and the main valve body.

Thus, it is seen that a weldless valve connection is provided along with an ability to install the connector nut(s) as the last two steps in the valve manufacturing process, assuring essentially totally clean valve manufacturing and assembly operations. At the same time the normal sliding of the end fittings and the sizing thereof are not changed so that an "invention equipped" valve is completely interchangeable in a piping installation with a valve utilizing the prior art VCR-type connection.

BRIEF DESCRIPTION OF THE DRAWING

FIG. 1 is a partial cross-sectional side view of a typical "VCR"-type valve connector nut welded assembly of the prior art.

FIG. 2 is a cross-sectional side view of a valve body of the invention configured to receive a slide wire connector nut.

FIG. 3 is a cross-sectional side view of the connector nut of the invention.

FIG. 4 is a cross-sectional view of connector nut taken on the line 4—4 of FIG. 3.

FIG. 5 is a cross-sectional view of the connector nut as installed on the valve body of FIG. 2 with the nut in retracted position.

FIG. 6 is a cross-sectional view of the connector nut as installed with the nut in extended position.

DETAILED DESCRIPTION

The valve body of the invention in a typical configuration is seen in FIG. 2. A main valve body 30 has an interior cavity 31 into which the valve internals (not shown) such as a valve seat, bellows, piston assembly, seals and control ports are assembled as seen broadly in the U.S. Pat. No. 4,634,099. In the present invention a pair of elongated tubes or stubs 32 of a first diameter $D_1$ extend integrally in a one-piece construction from the main valve body 30. Each of the stubs 32 having a length $L_0$ has a distal end 33 having a second diameter $D_0$ about 2.4 mm to about 2.8 mm larger than stub diameter $D_1$ and forming an elongated annulus 34 between a valve body exterior wall 36 and the distal end 33. The annulus has a depth of from about 1.2 mm to about 1.4 mm. A control radius $R_0$ of 90° arc is machined or otherwise formed on the reverse end of the distal end and a vacuum face seal 35 is formed corresponding to face seal 19 in FIG. 1.

As seen in FIG. 3 a complementary circumferential compression nut 40 has an internal bore 41 with internal threads 42 at one end. $L_t$ designates the length of the nut threads while $L_n$ is the overall nut length. These correspond to the nut lengths and thread lengths in the VCR-type nut. The threads 42 function as do threads 14 in FIG. 1 to connect connection tubing 21 and a gasket 20 into the threaded nut interior. An interior land 48 is present in the nut bore 41 so that 1) $D_0$ is clear of the threads when the nut is tightened, and 2) to assure that the test orifice (corresponding to orifice 25 in FIG. 1 does not break into the threaded area 42. The internal bore 41 noted by diameter $D'_0$ has a cylindrical semi-circular groove 43 inboard of the end of the nut opposite the end having the entrance threads 42. This groove also essentially has a radius $R_0$ forming a groove bottom diameter of $D'_0 + 2R_0$, where $D'_0$ represents a third diameter slightly greater than the distal end diameter $D_0$ allowing the nut to slide over the distal end for assembly on the stub. This $D_0$ and $D'_0$ diametric differential will normally be from about 0.1 mm to about 0.3 mm.

FIG. 4 is a cross-section of the nut showing groove 43 and a tangential aperture 44 extending from the end of a hexagon flat 45 to the groove 43. The aperture is shown as being at a 30° axis angle to the nut horizontal axis and with a diameter of $2R_0$. A slide wire 46 normally made of stainless steel and having a diameter $2R_0$ or slightly smaller than $2R_0$ is threaded or slid into aperture 44 and into the entire cylindrical extent of groove 43 after the nut has been slid over the tube distal end 33 (FIG. 2) so that the outer half of the slide wire is in groove 43 and the inner half of the slide wire is in annulus 34, thus locking the nut in the annulus 34 as seen in FIG. 5.

In FIG. 5 the slide wire 46, incorporated in locking or captured position in the nut groove 43, is shown in a retracted shipping position in annulus 34 at a position juxtaposed to a side wall 36 of the valve main body 30 at the inner end of annulus 34.

As seen in FIG. 6, when the valve is to be assembled with connection tubing such as tubing 21 (FIG. 1), the nut 40 is extended to the outer end of the annulus 34 by the assembler, a gasket 20 inserted against the face 35 and the face 22 of the connection tubing (FIG. 1) advanced to compress the gasket between the faces 22 and 35, in the same manner as in FIG. 1. The slide wire in groove 43 at this same time compresses and seats into the controlled recess $R_0$ on the reverse end of the distal end 33 of the stub 32.

While the invention has been described in terms of a valve body connector, the connector nut of this invention may be needed in association with any other flow device body having inlet and/or outlet tubes extending therefrom which are to be connected to connection tubing. These devices include gauges, flowmeters, pressure and flow regulators, mass flow controllers and the like.

The above description of the preferred embodiment of this invention is intended to be illustrative and not limiting. Other embodiments of this invention will be obvious to those skilled in the art in view of the above disclosure.

We claim:

1. A flow device body-nut connection assembly comprising:
   a flow device body having at least one elongated integral tube of a first diameter extending from a side of said body, said at least one tube having a distal end flange of a second diameter greater than said first diameter and forming an elongated circumferential annulus along said at least one tube between said distal end flange and said body, the end of said annulus opposite said body having a radiused load-bearing surface;
   a circumferential nut having an internal bore of a diameter greater than the second diameter of said distal end flange and being slidably mountable over said distal end flange, said nut bore having an internal circumferential groove juxtaposed to a first end of said nut overlapping said annulus and having a tubing connection surface positioned on a second end of said nut; and
   a load-carrying slide wire of circular cross-section insertable through a nut wall aperture of said nut circumferentially into said groove and said annulus at any position of said groove along said annulus constructed and arranged that said nut is slidingly captured in said annulus and wherein said nut and a substantially 360° loop of said inserted slide wire is movable into bearing and interfitting abutment with said tube distal end flange against said annulus radiused load-bearing surface when a connecting tube is connected to said tubing connection surface and sealed by a vacuum face seal at a peripheral end surface of said tube distal end flange such that a sealing compression force is transferred through said nut and said slide wire to said distal end flange.

2. The connection assembly of claim 1 in which said at least one longitudinal elongated tube and said flow device body is of a one-piece construction.

3. The connection assembly of claim 2 including a pair of said elongated tubes integrally extending from said body providing a valve inlet and a valve outlet and an associated circumferential nut and inserted slide wire on each of said elongated tubes.

4. The connection assembly of claim 1 wherein said second diameter is from about 2.4 mm to about 2.8 mm larger in diameter than said first diameter.

5. The connection assembly of claim 1 in which said internal bore diameter is from about 0.1 mm to about 0.3 mm larger in diameter than said distal end second diameter.

6. The connection assembly of claim 1 in which said elongated circumferential annulus has a depth of from about 1.2 mm to about 1.4 mm.

7. The connection assembly of claim 1 in which said radiused end has a radius end interfitting with a substantially 90° arc of said inserted slide wire.

8. The connection assembly of claim 1 in which said tubing connection surface is a threaded surface in said nut interior bore displaced from said nut bore groove and the connecting tube is threadedly connected to said bore threaded surface.

* * * * *